US007637336B2

(12) United States Patent
Enomoto et al.

(10) Patent No.: US 7,637,336 B2
(45) Date of Patent: Dec. 29, 2009

(54) HYDRAULIC CIRCUIT DEVICE AND HYBRID DRIVE SYSTEM USING THAT HYDRAULIC CIRCUIT DEVICE

(75) Inventors: Kazuhito Enomoto, Anjo (JP); Kiyotomo Mirua, Anjo (JP); Satoru Wakuta, Anjo (JP); Kazuhisa Ozaki, Anjo (JP); Nobuyuki Nagashima, Toyota (JP); Masato Fujikawa, Toyota (JP); Tomoyuki Maruyama, Toyota (JP); Masatoshi Adachi, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 529 days.

(21) Appl. No.: 11/377,342

(22) Filed: Mar. 17, 2006

(65) Prior Publication Data

US 2006/0231339 A1 Oct. 19, 2006

(30) Foreign Application Priority Data

Mar. 22, 2005 (JP) ............................ 2005-081755

(51) Int. Cl.
*F01M 11/00* (2006.01)

(52) U.S. Cl. ........................ 180/69.1; 180/339; 184/6.9

(58) Field of Classification Search ................ 180/69.1, 180/339; 123/196 A, 196 CP, 196 AB, 196 R; 184/6.9
See application file for complete search history.

(56) References Cited

U.S. PATENT DOCUMENTS

| | | | | |
|---|---|---|---|---|
| 3,888,228 | A * | 6/1975 | Koivunen | 123/196 R |
| 3,973,549 | A * | 8/1976 | Drummond | 123/198 R |
| 3,980,153 | A * | 9/1976 | Andrews | 180/69.1 |
| 4,068,646 | A * | 1/1978 | Hnojsky | 123/195 C |
| 4,577,713 | A * | 3/1986 | Moon | 180/69.1 |
| 4,683,850 | A * | 8/1987 | Bauder | 123/195 C |
| 4,995,971 | A * | 2/1991 | Droste et al. | 210/167.03 |
| 5,415,603 | A | 5/1995 | Tuzuki et al. | |
| 5,665,171 | A * | 9/1997 | Leaphart | 134/22.18 |
| 5,799,631 | A | 9/1998 | Nakamura | |
| 5,971,719 | A | 10/1999 | Takeuchi | |
| 6,143,169 | A * | 11/2000 | Lee | 210/167.02 |
| 6,183,632 | B1 * | 2/2001 | Covington | 210/167.02 |
| 6,520,293 | B1 * | 2/2003 | Ogawa et al. | 184/6.22 |
| 6,539,912 | B1 * | 4/2003 | Beer | 123/196 R |
| 6,616,836 | B1 * | 9/2003 | Covington | 210/167.02 |
| 6,640,767 | B2 * | 11/2003 | Kato et al. | 123/195 C |
| 6,895,920 | B2 * | 5/2005 | Pierro | 123/195 C |
| 7,131,421 | B2 * | 11/2006 | Hada et al. | 123/196 R |
| 7,204,224 | B2 * | 4/2007 | Hazelton et al. | 123/195 C |
| 7,387,190 | B2 * | 6/2008 | Lochocki, Jr. | 184/106 |
| 7,444,729 | B2 * | 11/2008 | Lochocki | 29/407.01 |

(Continued)

FOREIGN PATENT DOCUMENTS

| | | |
|---|---|---|
| JP | U-59-67660 | 5/1984 |

(Continued)

*Primary Examiner*—Jeffrey J Restifo
(74) *Attorney, Agent, or Firm*—Oliff & Berridge, PLC

(57) ABSTRACT

Drain holes are arranged in positions offset from valve holes of a valve body. The drain holes have a long chimney-shaped space such that even if insulation material, that has peeled off of an electric motor, is suspended in oil, it is less likely to enter drain chambers through the drain holes.

20 Claims, 4 Drawing Sheets

U.S. PATENT DOCUMENTS

| | | | | |
|---|---|---|---|---|
| 2006/0118077 | A1* | 6/2006 | Hada et al. | 123/196 R |
| 2008/0066982 | A1* | 3/2008 | Kobayashi et al. | 180/69.1 |
| 2008/0236952 | A1* | 10/2008 | Shimizu et al. | 184/6.22 |
| 2008/0286123 | A1* | 11/2008 | Yoshinami | 417/118 |
| 2009/0014248 | A1* | 1/2009 | Yamashita et al. | 184/6.24 |
| 2009/0020366 | A1* | 1/2009 | Mori et al. | 184/106 |

FOREIGN PATENT DOCUMENTS

| | | |
|---|---|---|
| JP | A-5-330348 | 12/1993 |
| JP | U-6-59657 | 8/1994 |
| JP | A 10-184859 | 7/1998 |
| JP | A-10-331961 | 12/1998 |
| JP | A-2004-353780 | 12/2004 |

* cited by examiner

F I G . 3
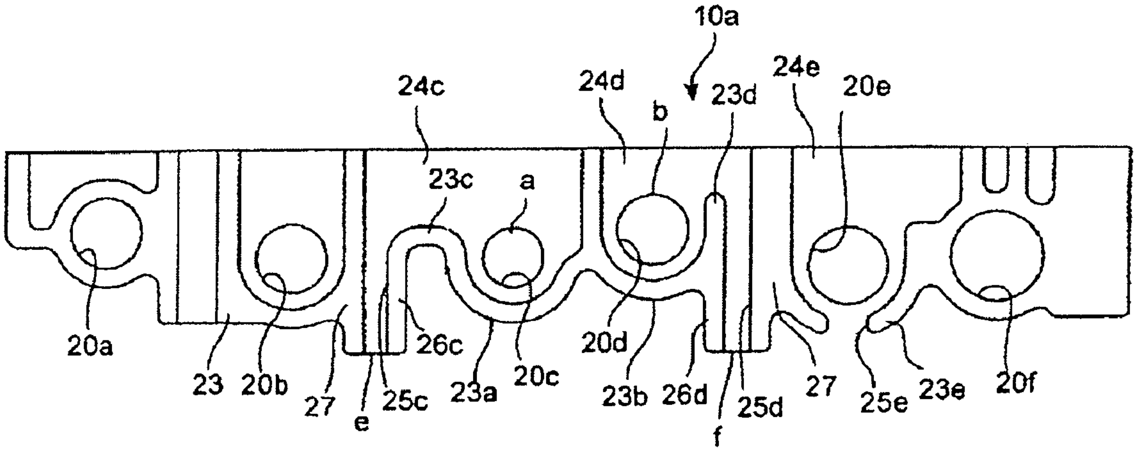

HYDRAULIC CIRCUIT DEVICE AND HYBRID DRIVE SYSTEM USING THAT HYDRAULIC CIRCUIT DEVICE

CROSS-REFERENCE TO RELATED APPLICATION

The disclosure of Japanese Patent Application No. 2005-081755 filed on Mar. 22, 2005, from which priority is claimed, including the specification, drawings and abstract is incorporated herein by reference in its entirety.

BACKGROUND

The disclosure relates to a hydraulic circuit device suitable for being applied to a valve body in a power train, especially a hybrid drive system, mounted in a vehicle. More particularly, the disclosure relates to a drain of a hydraulic circuit device.

A power train, such as an automatic transmission or a hybrid drive system, mounted in a vehicle typically includes a hydraulic circuit device which supplies oil that serves as lubrication oil or working oil. The hydraulic circuit device includes a valve body and various valves arranged within the valve body. The valve body is arranged in an oil pan provided in a lower portion of a case of the automatic transmission or hybrid drive system.

An oil strainer is arranged underneath the valve body. Oil in the oil pan is drawn up through the oil strainer, and the pressure of the oil is then regulated and switched appropriately by a changeover valve such as a shift valve, a pressure regulating valve such as a regulator valve or a modulator valve, and another valve such as a check valve. After being regulated and switched, the oil is then supplied, either as working oil, to the various hydraulic servos of the automatic transmission or hybrid drive system, or as lubrication oil, to the areas that need lubricating.

Formed in the valve body are a cylindrical valve hole which houses various valves, a communicating passage that is connected to a port of each valve, and a drain hole which provides communication between the valve hole and an external portion. Based on the switching position of the changeover valve, communication is opened between an input port and a drain port such that excess oil at the pressure regulating valve is released through the drain port. The oil from the drain port is then discharged outside the valve body where it is recovered to the oil pan (see Japanese Patent Application Publication No. JP-A-10-184859).

In the related art, the drain hole opens at a central portion of a valve hole in a valve body such that drain oil from the drain port of each valve is quickly discharged from the drain hole to the outside.

The related art has the drain hole formed near the apex of a cylindrical bulging portion of a valve body in which the valve hole is formed (see reference character 25*e* in FIG. 3). This structure has an excellent oil discharge capability because oil discharged from the drain port of the valve flows directly into the oil pan from the drain hole corresponding to the drain port. However, solid debris (foreign matter), such as metal dust and bits of resin mixed in with the oil in the oil pan, can easily enter the valve hole from the drain hole. When foreign matter enters the valve port and spool, it may cause the valve to stick.

In particular, a hybrid drive system is provided with electric motors (a control motor and a drive motor) so lubrication oil flows to cool the motors. At that time, insulating material, such as varnish used to coat the coils, peels off and mixes in the form of resin (coating) bits with the oil. In particular, in the case of vehicles provided with an FR hybrid drive system, a drive motor with increasingly large capacity is used for larger vehicles. Large capacity drive motors generate a large amount of heat, which means that a large amount of oil is used to cool the drive motor. This, combined with the fact that the oil pan is arranged at the lower portion of the drive motor case, results in a tendency for oil containing large amounts of resin bits to be circulated directly back to the oil pan.

Due to their respective specific gravities, the metal dust sinks to the bottom of the oil pan while the bits of resin are suspended in the oil. Therefore, while not much metal dust enters the valve hole through the drain hole in the valve body that is positioned in the upper portion of the oil pan, it is highly likely that bits of resin will enter the valve hole through the drain hole.

SUMMARY

The disclosure thus aims to provide a hydraulic circuit device that prevents foreign matter, such as bits of resin mixed in with oil, from entering through a drain hole, as well as a hybrid drive system using such a hydraulic circuit device.

A hydraulic circuit device according to a first aspect is structured such that a drain hole is arranged offset from a valve hole to which a valve is mounted. Accordingly, even if there is foreign matter such as bits of resin mixed in with the oil, for example, that foreign matter will not directly enter the drain port from the drain hole, thus enabling reduced valve sticking.

The hydraulic circuit device according to a second aspect is structured such that the drain hole has a long chimney-shaped open space. Accordingly, even if foreign matter such as bits of resin is suspended in the oil and the foreign matter floats into the drain hole, for example, it is highly likely that the foreign matter will be discharged from the drain hole by drain oil of the valve. As a result, it is possible to reduce the likelihood of foreign matter entering the drain chamber, and further, the spool portion of the drain port, and thus causing valve stick.

The hydraulic circuit device according to a third aspect is structured such that even if the foreign matter floats into the drain hole and travels up to the drain chamber, for example, it will not directly enter the valve that is mounted to the valve hole, but instead will likely be discharged to the drain hole from the inlet portion of the drain chamber as oil is discharged from the drain port.

The hydraulic circuit device according to a fourth aspect is structured such that an opening of the drain hole is arranged near a top surface of a strainer cover. Accordingly, large foreign matter can be prevented from reaching the opening of the drain hole, thus reducing the possibility of foreign matter entering the drain hole.

The hydraulic circuit device according to a fifth aspect is structured such that foreign matter mixed in with the oil is blocked by front and rear ridges when the hydraulic circuit device is mounted in a vehicle and oil in the oil pan moves back and forth in the front-rear direction when the vehicle starts and stops movement. Accordingly, the foreign matter is not led directly into the drain hole so the likelihood that it will enter the drain hole is reduced. Furthermore, oil from the drain hole is able to be quickly discharged from left and right communication passages.

The hydraulic circuit device according to a sixth aspect is structured such that the drain port of the valve is open during normal operation (i.e., initially). Normally in this case, foreign matter would tend to enter through the drain port and cause valve stick, but as described in the foregoing first to fifth aspects, foreign matter is prevented from entering through the drain hole, thus reducing the occurrence of valve stick.

In a hybrid drive system provided with electric motors, such as a control motor and a drive motor, bits of resin that are used as insulating material, particularly bits of resin in which varnish used to coat the coils has peeled off, tends to mix in with lubrication oil used to cool the electric motors. Also, because a transmission is provided, a changeover valve is necessary, as is a drain hole from which oil is not always discharged even during operation. The bits of resin (coating) suspended in the oil tend to enter through the drain hole. A hybrid drive system according to a seventh or eighth aspect, however, is structured such that, as described in the foregoing first to sixth aspects, foreign matter is prevented from entering through the drain hole, which reduces the occurrence of valve stick. As a result, a highly reliable hybrid drive system can be provided.

A FR hybrid drive system in which various devices are arranged on a single axis requires a large electric chive motor. Cooling the large electric drive motor requires a large amount of lubrication oil adequate for the amount of heat generated, which increases the likelihood that there will be bits of resin mixed in which the oil. Moreover, the bits of resin are suspended in the oil and circulated back from the motor case portion directly to the oil pan and the valve body, increasing the likelihood that they will enter through the drain hole. The hybrid drive system according to a ninth aspect, however, is structured such that, as described in the foregoing first to sixth aspects, the bits of resin are prevented from entering the drain hole, thus reducing the occurrence of valve stick. As a result, a highly reliable FR hybrid drive system is able to be provided.

BRIEF DESCRIPTION OF THE DRAWINGS

The disclosure will be made with reference to the drawings, in which:

FIG. 3 is a sectional view of a lower body of a valve body;

DETAILED DESCRIPTION OF EMBODIMENTS

Figure 1:
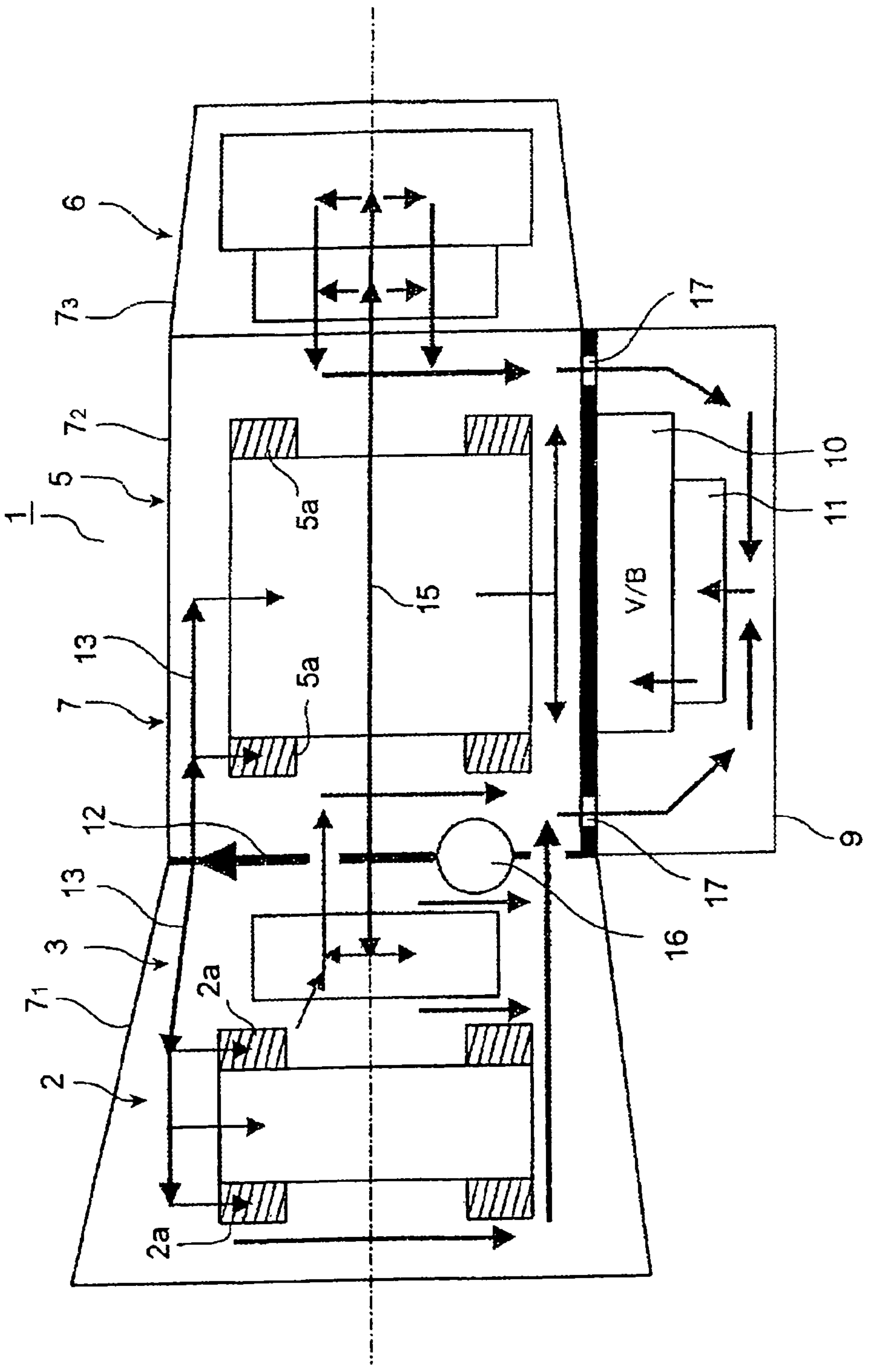
FIG. 1 is a schematic of lubrication/cooling paths in a hybrid drive system.

An exemplary embodiment will be described with reference to the drawings. FIG. 1 is a view of a hydraulic circuit device in a hybrid drive system to which the hydraulic circuit device has been applied. The hybrid drive system 1 is for an FR (front engine, rear wheel) drive vehicle. An internal combustion engine (not shown), is connected to the left side of the hybrid drive system 1 and a propeller (drive) shaft (not shown), is connected to the right side thereof, extending toward rear wheels. The hybrid drive system 1 includes a control electric motor 2, a power distributing planetary gear 3, a drive electric motor 5, and a transmission 6 arranged in order on a single axis aligned with a crankshaft from the engine side. These devices are housed in a case 7 which is made up of separate case portions $7_1$, $7_2$, $7_3$ that have been assembled into a single unit.

An oil pan 9 is connected underneath the motor case portion $7_2$ that houses the drive electric motor 5. A valve body 10 is fixed to the lower surface of the motor case portion $7_2$ in the oil pan 9. In addition, a strainer 11 is arranged in the oil pan 9 underneath the valve body 10. Oil passages 12, 13 are formed in a partition and side wall of the case 7. An oil passage 15 is also formed in an output shaft, which is a center rotating shaft, and the like.

The valve body 10 houses various valves, e.g., changeover valves such as shift valves, pressure regulator valves such as regulator valves and modulator valves, and other valves such as check valves. In addition, oil passages such as an oil passage that connects the valves and an input oil passage and an output oil passage that connects to the strainer 11 are formed in the valve body 10. Also, an oil pump 16, which is an electric pump or the like, is located in the oil passage from the strainer 11. The oil pump 16, the valve body 10 with valves, an oil control portion, and a lubrication oil supply portion, and the strainer 11 make up the hydraulic circuit device.

In the hybrid drive system 1, output from the engine is transmitted to a first element (e.g., a carrier) of the planetary gear 3 via a damper device and an input shaft, and then distributed by the planetary gear 3 from a second element (e.g., a sun gear) to the control motor 2, and from a third element (e.g., a ring gear) to the output shaft. In this case, the torque and rotation output to the output shaft can be adjusted steplessly by controlling the control motor 2. Meanwhile, output from the drive motor 5 is switched between two speeds, Hi and Low, by the transmission 6, which includes a Ravigneaux type planetary gear and switching mechanisms such as a low brake and a high brake, after which it is output to the output shaft. The drive motor 5 uses the power generated by the control motor 2 as an energy source, and when the generated power is insufficient, the drive motor 5 is driven also using energy from a battery that is stored by the control motor 2, which functions solely as a generator. Moreover, when the brake is operated, the drive motor 5 also functions as a regenerative generator.

The control motor 2 and the drive motor 5 are both brushless DC motors which have a stator around which coils 2*a*, 5*a* are wound, and a rotor which has a permanent magnet. Insulating members of synthetic resin are often used in the motors 2, 5. In particular, the coils 2*a*, 5*a* are coated with insulating material such as varnish.

A hydraulic circuit device formed of the valve body 10, and other elements noted above and described below, is provided in the hybrid drive system 1. The hydraulic circuit device has both a working oil control portion that controls the hydraulic pressure to hydraulic servos of the high brake and the low brake and the like, and a lubrication oil supply portion that supplies lubrication oil to areas that need lubricating. Oil passages 12, 13, 15 of the lubrication oil supply portion are shown in FIG. 1.

Oil stored in the oil pan 9 is drawn up through the strainer 11 by an oil pump 16 which operates when the hybrid drive system 1 is driven. The pressure of the oil is regulated by a lubrication oil pressure regulating valve inside the valve body 10. The pressure-regulated lubrication oil is then supplied via the oil passages 12, 13 to the control motor 2 and the drive motor 5 so as to both lubricate and cool the motors 2, 5. The coils 2*a*, 5*a* of the motors 2, 5, in particular, tend to generate heat and therefore must be cooled by a sufficient amount of lubrication oil. Meanwhile, lubrication oil is also supplied to center oil holes in the oil passage 15 in the output shaft, which is a center rotating shaft, and is led to the power distributing planetary gear 3 and the transmission 6, where it lubricates the planetary gear and the brakes and the like. After lubricating and cooling the motors 2, 5, the power distributing planetary gear 3, and the transmission 6, the lubrication oil then flows along the bottom surface of the case 7 and is circulated back into the oil pan 9 through communication holes 17, 17.

Figure 2:
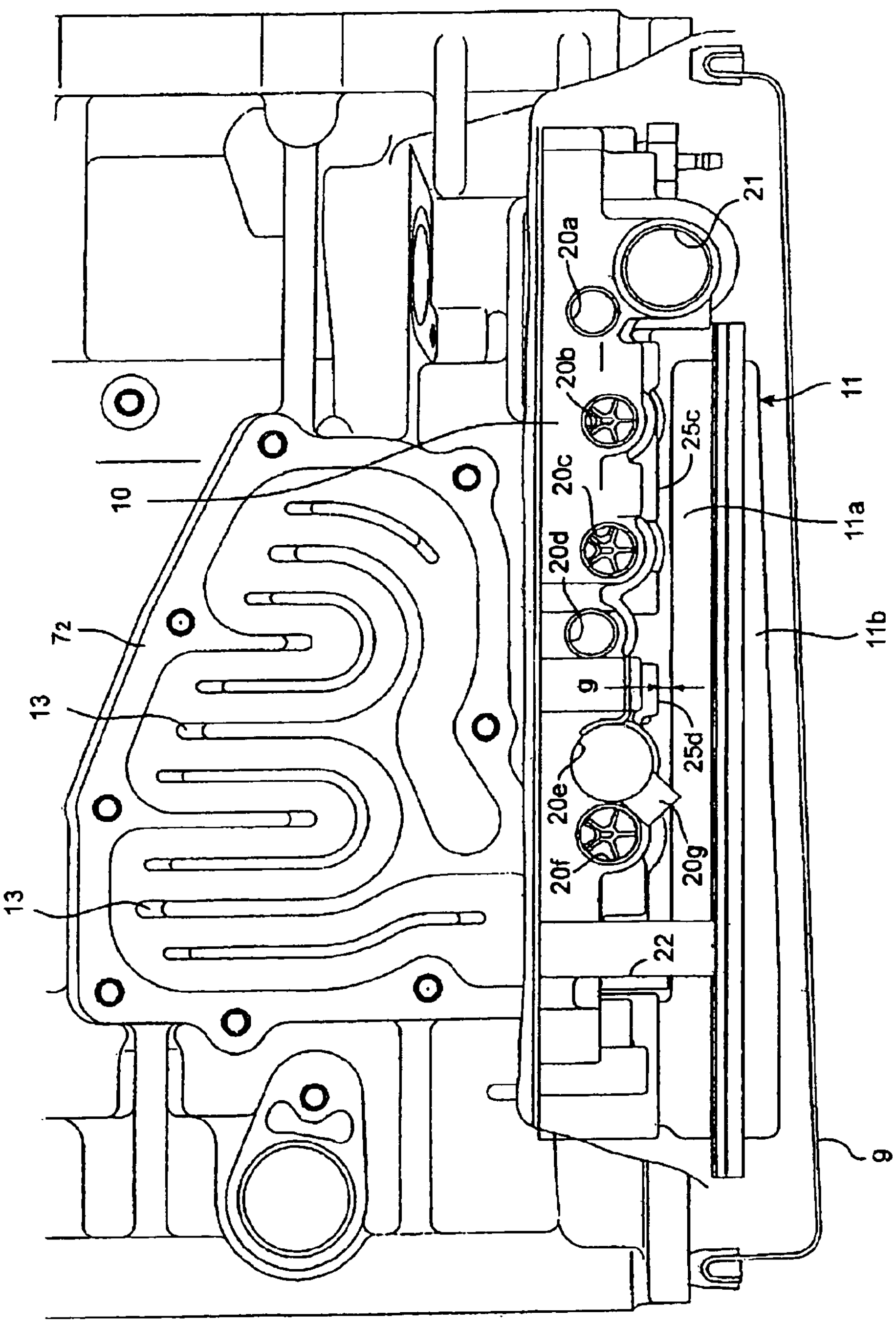
FIG. 2 is a side view of a motor case portion and an oil pan portion of the hybrid drive system with a portion removed.

FIG. 2 is a side view of the motor case portion $7_2$ and the oil pan 9 portion with a portion removed. The left side of the drawing is the power distributing planetary gear 3 (i.e., the front or engine) side, and the right side of the drawing is the transmission 6 (i.e., the rear) side. Multiple oil passages 13 for cooling and lubricating the drive motor 5 are formed in the motor case portion $7_2$. The valve body 10, in which multiple valve holes 20*a*, 20*b*, 20*c*, 20*d*, 20*e*, 20*f*, and oil passages are formed is arranged at the lower portion of the motor case portion $7_2$. A valve assembly, such as a spool and spring assembly, is received in each valve hole 20*a*-20*e*. The drawing also shows a hole 21 for a hydraulic pressure vibration control damper, a valve hole 20*e* for a pressure regulating valve which regulates the hydraulic pressure, and a connector 20*g* of the valve hole 20*e*. Also, some of the valve holes are shown closed with a screw and some are shown not closed with a screw.

The strainer 11 is arranged underneath the valve body 10, with a predetermined narrow clearance between it and the valve body 10. The upper side of the strainer 11 is a cover 11*a* made of metal or synthetic resin. A strainer portion 11*b* made of non-woven fabric or the like is fixed to the lower surface of the cover. An intake hole 22 extends from the space in the strainer 11 and is connected to the oil pump 16 and a regulator valve.

FIG. 3 is a sectional view of a lower body 10*a* of the valve body 10. The right side of the drawing is the front (i.e., engine) side, and the left side is the rear side. The valve holes 20*a*, 20*b*, 20*c*, 20*d*, 20*e*, 20*f* described above are formed in the lower body 10*a*. Drain chambers 24*c*, 24*d*, 24*e* are formed in portions of the valve holes 20*c*, 20*d*, 20*e*. These drain chambers are connected to drain ports (not shown) of the valves and oil is discharged from these valve drain ports.

A lower wall surface 23 of the lower body 10*a* bulges outward (bulging portions 23*a*, 23*b*, 23*e*) so as to surround each of the valve holes 20*c*, 20*d*, at a portion of the drain chambers 24*c*, 24*d*. Wall portions 23*c*, 23*d* which protrude upward along the valve holes 20*c*, 20*d* are formed adjacent to the bulging portions 23*a*, 23*b*. The wall portions 23*c*, 23*d* extend to a level that is substantially the same as that of upper ends a, b of the valve holes 20*c*, 20*d*. Drain holes 25*c*, 25*d* are formed in positions offset to the front and rear from the valve holes 20*c*, 20*d* (i.e., a direction alternating with the axial direction of the valve holes). The drain holes 25*c*, 25*d* are formed, extending downward in a chimney shape, by surfaces of partitions 27, 27 of the lower body 10*a* and rising surfaces 26*c*, 26*d* which extend continuous with the wall portions 23*c*, 23*d*. Lower end open portions e, f of the drain holes 25*c*, 25*d* face the upper surface of the strainer cover 11*a* across a narrow gap g (see FIG. 2, shown substantially at the drain hole 25*d*) of approximately 3 mm. Valves (not shown) are mounted to the valve holes 20*c*, 20*d* having the offset drain holes 25*c*, 25*d*. The valves are such that the drain ports are open during normal operation (i.e., initially) so if there is suspended foreign matter in the drain chambers 24*c*, 24*d*, it tends to enter through the drain ports and the valves tend to stick.

On the other hand, the drain chamber 24*e* of the valve hole 20*e* has a drain hole 25*e* formed at the apex portion of the bulging portion 23*e*, i.e., directly under the valve hole 20*e*, of the lower body 10*a* in which the valve hole 20*e* is formed. The drain hole 25*e* is according to the related art, but the valve mounted to the valve hole 20*e* is such that the drain port is closed by the spool when the valve is not operating (i.e., during normal operation and in the initial state). Thus, even if foreign matter, such as bits of resin suspended in the oil, enter the drain chamber 24*e* through the drain hole 25*e* that is directly below, for example, they will not enter the spool from the drain port because the drain port of the valve is normally closed. Accordingly, the likelihood of valve stick occurring is low.

Continuing on, the operation of the example embodiment will now be described. The hybrid drive system 1 is such that the lubrication oil is circulated back into the oil pan 9 through the communication holes 17, 17 after lubricating and cooling the control motor 2, the power distributing planetary gear 3, the drive motor 5, and the transmission 6. The oil in the oil pan 9 contains foreign matter, such as metal dust produced by wearing of the gears and the like, and bits of resin made up of bits of motor insulation. The metal dust sinks to the bottom of the oil pan 9 because of its specific gravity, while the resin bits, specifically bits of peeled off varnish used to coat the coils 2*a*, 5*a*, are film-like and tend to become suspended in the oil. The drive motor 5 is large so the surface area of the coils 5*a* is also large and a large quantity of heat is generated, thus requiring a lot of lubrication oil to cool the drive motor 5. As a result, a lot of varnish peels off of the coils 5*a* and the oil containing these peeled-off resin coating bits tends to be circulated directly back through the communication holes 17 to the oil pan 9 that is directly under the motor case portion $7_2$.

Although the oil in the oil pan 9 contains suspended bits of resin, the lower surface of the valve body 10 having the drain hole is arranged near the upper surface of the cover 11*a* of the strainer 11 so the bits of resin, specifically peeled-off varnish resin coating which has a large area, are not easily able to fit into the gap g portion between the valve body 10 and the strainer 11. In this way, large suspended bits of resin are prevented from entering the drain hole by the gap g.

Moreover, even if oil containing suspended bits of resin enters the gap 8 portion, and then enters the drain holes 25*c*, 25*d*, for example, the bits do not immediately enter the spool portion from the valve drain port because the drain holes 25*c*, 25*d* are arranged offset from the valve holes 20*c*, 20*d*. Instead, suspended foreign matter floating in the drain hole portion or the drain chamber near that drain hole portion is discharged from the drain hole by oil that is discharged from the drain port when the valve switches.

Furthermore, the drain holes 25*c*, 25*d* have chimney-shaped spaces formed in the length direction by the rising portions 26*c*, 26*d* of the wall surfaces and the partitions 27. Therefore, when the drain hole is closed by the valve such that oil is retained and no oil is drawn in or discharged to the drain chambers 24*c*, 24*d*, it is extremely unlikely that suspended debris from outside the valve will pass through the long drain hole and travel up to the drain chambers. Even if suspended debris does travel up to the middle portion of the long drain hole, it is discharged outside from the drain holes 25*c*, 25*d* together with drain oil as the drain oil is discharged into the drain chambers 24*c*, 24*d* when the valve is switched to the drain chamber.

Therefore, even if resin foreign matter, such as bits of peeled-off varnish are mixed in with the oil, the foreign matter will not enter the valve through the drain holes 25*c*, 25*d* and the drain chambers 24*c*, 24*d*, so valve stick will not occur.

Figure 4B:
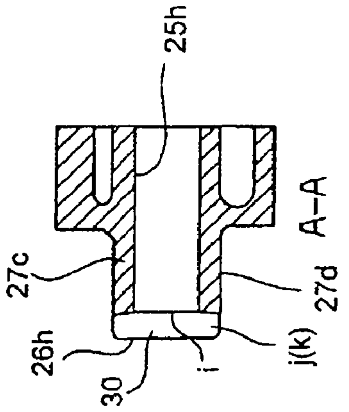
FIG. 4B is a cross-section along line 4-4 in FIG. 4A.
Figure 4A:
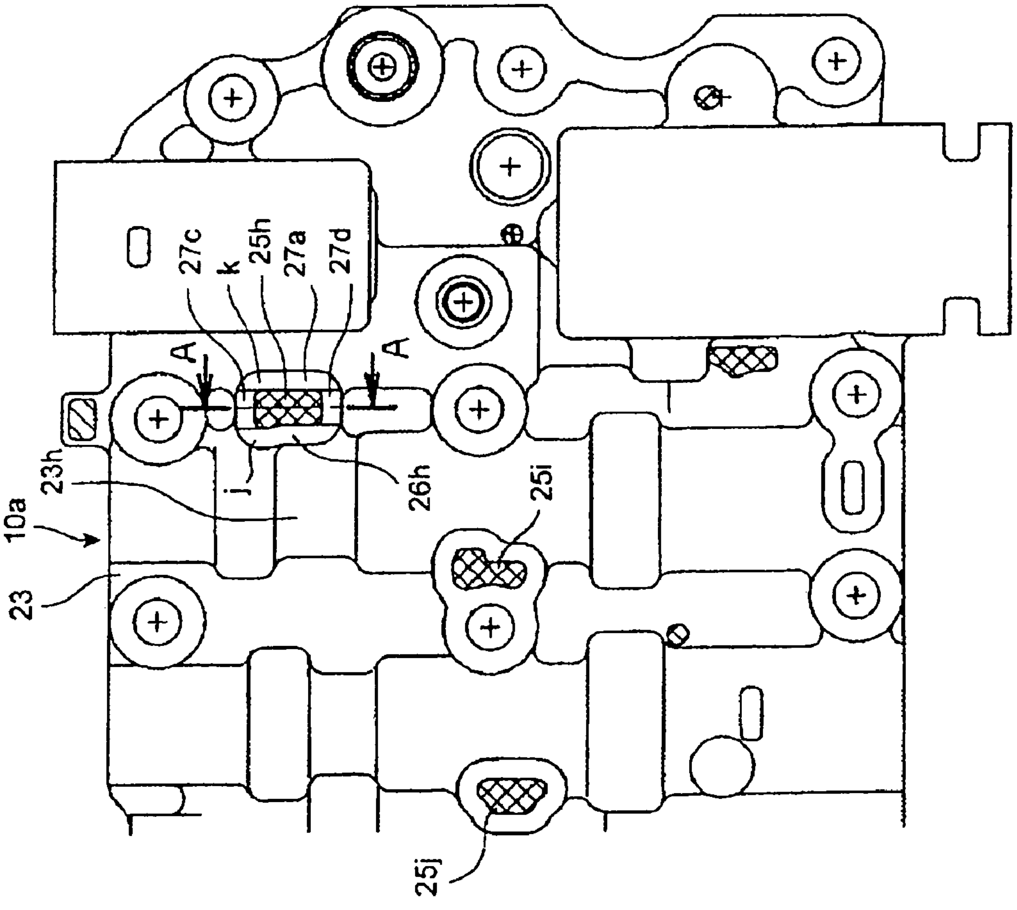
FIG. 4A is a bottom view of a valve body according to another exemplary embodiment.

FIG. 4A is a bottom view of the lower valve body 10*a* according to another exemplary embodiment, with the left in the drawing being toward the front and the right being toward the rear. In the drawing, reference character 23*h* denotes the bulging portion for forming the valve hole, which is formed in the lower wall surface 23 of the valve body. A drain hole 25*h*, which is similar to the foregoing drain holes 25*c*, 25*d*, is formed offset in the valve hole located in the bulging portion 23*h*. The drain hole 25*h* has a rectangular cross-section shape formed by a rising portion 26*h* which rises downward from a wall surface of an end portion of the bulging portion 23*h*, a rising portion 27a of the partition 27, and left and right side surface portions 27c, 27d. The drain hole 25h is structured such that the rising portions 26h, 27a, which are wall surfaces in the front-rear direction of the vehicle, are high and the left and right side surface walls 27c, 27d are low compared with the foregoing rising portions. As a result, front and rear ridge portions j, k (FIGS. 4A, 4B) formed by the high portions of the wall surfaces 26h, 27a in the front-rear direction are formed at an open i portion of the drain hole 25h. The ridge portions j, k are arranged such that the upper surfaces thereof abut with, or are near, the upper surface of the strainer cover 11a. As a result, a communication passage 30, that is open to the left and the right, is formed by the low side wall surfaces 27c, 27d.

When the vehicle in which the hybrid drive system 1 is mounted starts and stops movement, inertia and the pitch of the vehicle body cause the oil in the oil pan 9 to move back and forth in the front-rear direction. This movement of the oil makes it easy for foreign matter suspended in the oil to enter the drain hole 25h. Because the ridge portions j, k, which are formed by the front and rear rising portions, are formed to the front and the rear of the open i portion of the drain hole 25h, however, suspended foreign matter is prevented from directly entering the drain hole 25h when the oil moves. On the other hand, oil is able to quickly flow from the drain chamber through the communication passage 30 which is open to the left and right.

In FIG. 4A, reference characters 25i, 25j also denote drain holes. Further, the front and rear ridge portions j, k of the drain hole 25h are formed on the wall surface of the valve body 10 in this example embodiment. Alternatively, however, the front and rear ridge portions j, k may also be formed on an opposing portion of the strainer cover 11a. Also, the drain hole is not limited to a hydraulic circuit device of a hybrid drive system, but can also be applied to another hydraulic circuit device, such as a hydraulic circuit device of an automatic transmission. Moreover, while the disclosure in the foregoing exemplary embodiments are applied to a hybrid drive system having a control electric motor, a power distributing planetary gear, a drive electric motor, and a transmission, it is not limited to this; it can also be applied to a hybrid drive system having an electric motor and a transmission.

What is claimed is:

1. A hydraulic circuit device, comprising:
- an oil pan at a lower portion of a case; and
- a valve body arranged in the oil pan and at the lower portion of the case, comprising:
  - a valve hole;
  - a drain port;
  - a drain chamber fluidly connected to the drain port; and
  - a drain hole fluidly connecting the drain chamber with an external portion outside the valve body and in the oil pan, wherein the drain hole is arranged offset from the valve hole in a direction alternating with an axial direction of the valve hole.

2. The hydraulic circuit device according to claim 1, wherein the drain hole has a long chimney-shaped space.

3. The hydraulic circuit device according to claim 2, wherein a drain chamber side of the drain hole extends to substantially a same level as that of an upper end of the valve hole of the drain chamber.

4. The hydraulic circuit device according to claim 3, wherein a strainer is arranged in the oil pan; and a covered upper surface of the strainer is arranged near an opening of the drain hole.

5. The hydraulic circuit device according to claim 4, wherein ridge portions are formed to a front and rear of the opening of the drain hole; and a communicating passage that opens left and right is formed between the front and rear ridge portions.

6. The hydraulic circuit device according to claim 5, wherein the drain port of a valve is open during normal operation.

7. A hybrid drive system, comprising:
- an electric motor, a transmission, and the hydraulic circuit device according to claim 6, wherein
- the electric motor and the transmission are housed in the case and the valve body is arranged in the oil pan at the lower portion of the case; and
- lubrication oil, a pressure of which has been regulated by a pressure regulating valve in the valve body, is circulated back to the oil pan after being supplied to the electric motor.

8. A hybrid drive system including a control electric motor, a power distributing planetary gear, a drive electric motor, and a transmission, in which the power distributing planetary gear includes a first element to which output from an internal combustion engine is transmitted, a second element connected to the control electric motor, and a third element connected to an output shaft, and output from the drive electric motor is transmitted to the output shaft via the transmission, the hybrid drive system comprising:
- the hydraulic circuit device according to claim 6, wherein
- the control electric motor, the power distributing planetary gear, the drive electric motor, and the transmission are housed in the case, and the valve body is arranged in the oil pan at the lower portion of the case, and
- lubrication oil, a pressure of which has been regulated by a pressure regulating valve in the valve body, is circulated back to the oil pan after being supplied to the control electric motor and the drive electric motor.

9. The hybrid drive system according to claim 8, wherein the control electric motor, the power distributing planetary gear, the drive electric motor, the transmission, and the output shaft are all arranged on a single axis; and the oil pan and the valve body are arranged in a lower portion of a motor case portion which houses the drive electric motor.

10. The hydraulic circuit device according to claim 1, wherein a strainer is arranged in the oil pan; and a cover upper surface of the strainer is arranged near an opening of the drain hole.

11. The hydraulic circuit device according to claim 1, wherein ridge portions are formed to a front and rear of the opening of the drain hole; and a communicating passage that opens left and right is formed between the front and rear ridge portions.

12. The hydraulic circuit device according to claim 1, wherein the drain port of a valve is open during normal operation.

13. A hybrid drive system, comprising:
- an electric motor, a transmission, and the hydraulic circuit device according to claim 1, wherein
- the electric motor and the transmission are housed in the case and the valve body is arranged in the oil pan at the lower portion of the case; and
- lubrication oil, a pressure of which has been regulated by a pressure regulating valve in the valve body, is circulated back to the oil pan after being supplied to the electric motor.

14. A hybrid drive system including a control electric motor, a power distributing planetary gear, a drive electric motor, and a transmission, in which the power distributing planetary gear includes a first element to which output from an internal combustion engine is transmitted, a second element connected to the control electric motor, and a third element connected to an output shaft, and output from the drive electric motor is transmitted to the output shaft via the transmission, the hybrid drive system comprising:

the hydraulic circuit device according to claim 1, wherein the control electric motor, the power distributing planetary gear, the drive electric motor, and the transmission are housed in the case, and the valve body is arranged in the oil pan at the lower portion of the case, and lubrication oil, the pressure of which has been regulated by a pressure regulating valve in the valve body, is circulated back to the oil pan after being supplied to the control electric motor and the drive electric motor and cooling these motors.

15. The hybrid drive system according to claim 14, wherein the control electric motor, the power distributing planetary gear, the drive electric motor, the transmission, and the output shaft are all arranged on a single axis; and the oil pan and the valve body are arranged in a lower portion of a motor case portion which houses the drive electric motor.

16. A valve body arranged in an oil pan, as part of a hydraulic circuit device, and at a lower portion of a case, the valve body comprising:

at least one drain chamber fluidly connected to a drain port, each drain chamber associated with a valve hole to which a valve is attached; and a drain hole fluidly connected with at least one drain chamber and with an external portion outside the valve body and in the oil pan, wherein the drain hole is arranged in a position offset from the valve hole in a direction alternating with an axial direction of the valve hole.

17. The valve body according to claim 16, wherein the drain hole has a long chimney-shaped space.

18. The valve body according to claim 17, wherein a drain chamber side of the drain hole extends to substantially a same level as that of an upper end of the valve hole of the drain chamber.

19. The valve body according to claim 18, wherein a strainer is arranged in the oil pan; and an opening of the drain hole is arranged near a covered upper surface of the strainer.

20. The valve body according to claim 19, wherein ridge portions are formed to a front and rear of the opening of the drain hole; and a communicating passage that opens to each side is formed between the front and rear ridge portions.

* * * * *

UNITED STATES PATENT AND TRADEMARK OFFICE

CERTIFICATE OF CORRECTION

PATENT NO. : 7,637,336 B2
APPLICATION NO. : 11/377342
DATED : December 29, 2009
INVENTOR(S) : Enomoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 813 days.

Signed and Sealed this

Ninth Day of November, 2010

David J. Kappos

*Director of the United States Patent and Trademark Office*